United States Patent
Ott et al.

(10) Patent No.: US 10,981,756 B2
(45) Date of Patent: Apr. 20, 2021

(54) DEVICE FOR MEASURING THE WEIGHT OF A BALLAST ASSEMBLY OF A CRANE, AND CRANE COMPRISING A CORRESPONDING DEVICE

(71) Applicant: Liebherr-Werk Ehingen GmbH, Ehingen/Donau (DE)

(72) Inventors: Christian Ott, Niederhofen (DE); Bernd Boos, Mehrstetten (DE)

(73) Assignee: Liebherr-Werk Ehingen GmbH, Ehingen/Donau (DE)

(*) Notice: Subject to any disclaimer, the term of this patent is extended or adjusted under 35 U.S.C. 154(b) by 200 days.

(21) Appl. No.: 16/391,080

(22) Filed: Apr. 22, 2019

(65) Prior Publication Data
US 2019/0330030 A1 Oct. 31, 2019

(30) Foreign Application Priority Data
Apr. 23, 2018 (DE) .................... 10 2018 109 704.2

(51) Int. Cl.
| | | |
|---|---|---|
| B66C 13/16 | (2006.01) | |
| B66C 23/74 | (2006.01) | |
| G01G 3/12 | (2006.01) | |
| G01G 19/08 | (2006.01) | |
| G01G 21/22 | (2006.01) | |

(52) U.S. Cl.
CPC .............. *B66C 13/16* (2013.01); *B66C 23/74* (2013.01); *G01G 3/12* (2013.01); *G01G 19/08* (2013.01); *G01G 21/22* (2013.01)

(58) Field of Classification Search
CPC .......... G01G 3/12; G01G 19/08; G01G 21/22; G01G 21/28; B66C 13/16; B66C 23/74
See application file for complete search history.

(56) References Cited

U.S. PATENT DOCUMENTS

| | | | | | |
|---|---|---|---|---|---|
| 3,857,452 | A | * | 12/1974 | Hartman ................. | G01G 19/12 177/139 |
| 4,478,091 | A | * | 10/1984 | Forrester ................ | B60G 11/12 177/136 |
| 4,694,921 | A | * | 9/1987 | Johnston ................ | G01G 19/12 177/136 |
| 5,262,598 | A | * | 11/1993 | Stotler .................... | G01G 13/06 177/116 |
| 6,769,315 | B2 | * | 8/2004 | Stevenson .............. | G01G 19/12 73/794 |
| 9,188,476 | B2 | * | 11/2015 | Volker .................... | G01G 21/22 |
| 9,869,577 | B2 | * | 1/2018 | Dierneder ............. | G01G 21/244 |

FOREIGN PATENT DOCUMENTS

| | | |
|---|---|---|
| DE | 102017000431 A1 | 7/2018 |
| JP | H09058978 A | 3/1997 |

* cited by examiner

*Primary Examiner* — Randy W Gibson
(74) *Attorney, Agent, or Firm* — McCoy Russell LLP

(57) ABSTRACT

The application relates to a device for measuring the weight of a ballast assembly of a crane, and to a crane comprising a corresponding device. The device may include a ballast assembly coupled to the structure of the crane by seats, the seats may comprise a measurement shaft, and the measurement shaft deforming under a weight of the ballast assembly.

19 Claims, 5 Drawing Sheets

DEVICE FOR MEASURING THE WEIGHT OF A BALLAST ASSEMBLY OF A CRANE, AND CRANE COMPRISING A CORRESPONDING DEVICE

CROSS-REFERENCE TO RELATED APPLICATIONS

The present application claims priority to German Application No. 10 2018 109 704.2 entitled "DEVICE FOR MEASURING THE WEIGHT OF A BALLAST ASSEMBLY OF A CRANE, AND CRANE COMPRISING A CORRESPONDING DEVICE", filed Apr. 23, 2018. The entire contents of the above-listed application are hereby incorporated by reference for all purpose.

TECHNICAL FIELD

The application relates to a device for measuring the weight of a ballast assembly of a crane, and to a crane comprising a corresponding device.

BACKGROUND AND SUMMARY

Measuring the weight of ballast bodies is used to ensure appropriate ballasting of cranes. For this purpose, the crane has to be equipped with ballast weights, in accordance with corresponding load tables, in such a way that the crane is not damaged or destroyed when raising and lowering loads or when the load torque is changed or increased.

Automatic weight measurement may be used to monitor manually ballasted cranes with respect to the weight of the ballast bodies, and to send corresponding signals to the operators of the crane if the ballast body weight is too low, or to prevent, using control or regulation technology, raising of a load that is then too great.

A common problem of devices for measuring weight of ballast bodies is that corresponding sensors may be damaged during crane operation or during operation on construction sites in which the crane is operating. Furthermore, inadvertent incorrect entries by the operators may allow for raising of loads that are actually not permissible or may allow for incorrect setting of the crane, wherein the damaged or soiled sensors may erroneously display correct ballasting.

Problems can also arise in the case of unballasting or retrospective ballasting, which problems result from an initially correctly set and determined ballast mass being changed. In this case, the ballast mass of a first, correctly ballasted, crane may be changed by means of another crane. For example, a ballast plate may be removed from a correctly set ballast mass or added to a correctly set ballast mass. If the ballast mass state is not corrected correspondingly, in crane monitoring, following a change of this kind, dangers may result for the crane and the operators.

Against this background, the object of the application is that of providing an improved device for measuring the weight of a ballast assembly of a crane, which device functions in a more reliable and simpler manner.

This object is achieved by embodiments described in and envisioned by the application. According to an embodiment of the application, the ballast assembly is coupled to the remainder of the structure of the crane by means of at least three seats, wherein the seats comprise seating points on which the ballast assembly rests. Accordingly, the seating points can correspond to the contact regions of the seats, on which regions the seats are in contact with the ballast assembly. It is conceivable for one seating point to be assigned to each seat.

According to the application, at least one of the seats is configured as a weighing device that comprises at least one measurement shaft. In this case, the measurement shaft is a component that is different from the seating point and may not formed integrally with the seating point. According to the application, the weight of the ballast assembly can be determined on the basis of the loading and/or deformation of the measurement shaft.

For this purpose, at least one corresponding sensor may be provided on the measurement shaft or in the region of the measurement shaft, which sensor may be coupled to a regulation/control means of the crane. The sensor can record load values and/or deformation values of the measurement shaft and provide said values to the regulation/control means. The weight of the ballast assembly can be determined on the basis of said measurement values. The term "measurement shaft" is to be understood broadly, and can refer to any component of which the deformation and/or loading correlates with the weight of the ballast assembly.

In an embodiment of the application, it is conceivable for the measurement shaft to be arranged directly below the seating point. The measurement shaft can thus be located, in a defined manner, in the flow of force that corresponds to the introduction of the weight force of the ballast assembly into the subsurface of the crane. Such an arrangement of the measurement shaft makes it possible to increase the measuring accuracy of the device in a simple manner.

In a further embodiment, it is conceivable for at least the seat that is configured as a weighing device to be arranged so as to be pivotable, about a tilt shaft, relative to the remainder of the structure of the crane. In this case, the at least minimal pivoting of the seat about the tilt shaft is brought about by applying the ballast assembly or the corresponding weight. The deformations or loadings of the device that occur during pivoting can be used to more simply measure the weight of the ballast assembly. This is due to the fact that the pivotable arrangement of the seat means that it is possible to increase the change in position thereof under ballast, which can correspondingly lead to an increase in the loading and/or deformation of the measurement shaft. This increased loading and/or deformation of the measurement shaft can be determined more precisely by the sensor, in order to increase the measuring accuracy.

In a further embodiment, it is conceivable for at least one stop point to be provided, for fixing the seat, configured as a weighing device, relative to the remainder of the structure of the crane. While the seat that is pivotably hinged to the crane can be pivoted correspondingly by means of applying the ballast weight, said pivot movement can be limited, within a suitable frame, by the stop point.

In an embodiment, it is conceivable for the stop point to be the measurement shaft itself. In this case, the weighing device or the corresponding seat can also rest on or strike the stop point in an unloaded state, i.e. in a state without an applied ballast. In one embodiment, the freedom of pivot movement of the weighing device can be restricted by the stop point, and said device may be pivotable only away from the stop point, or maybe pivotable towards the stop point, only within elastic limits of the components involved.

In a further embodiment, it is conceivable for the stop point to be configured as a bolt running in a groove, as a ring comprising a recess, or as a shoulder. In this case, corresponding sensors for recording the loading or the deformation of the bolt, of the ring or of the shoulder may be provided at suitable locations.

In a further embodiment, it is conceivable for the seating point to be spherical or planar, and/or to comprise a gimbal and/or a spherical bearing.

In a further embodiment, it is conceivable for a connection to be provided, which is configured for positioning the ballast assembly in an interlocking manner with respect to the remainder of the structure of the crane. In this case, the connection can be different from the seating point and arranged further away from the ballast assembly than the seating point.

In an embodiment, it is conceivable for the connection and the seating point to be configured to introduce the weight force of the ballast assembly into the remainder of the structure of the crane, via the measurement shaft.

The device can thus be configured such that the weight force of the ballast assembly is introduced into the remainder of the structure of the crane exclusively via the connection and the seating point of a seat. In the present case, the expression "the remainder of the structure of the crane" comprises components of the device other than those mentioned in each case, which components are to be assigned to the crane itself. In this case, "the remainder of the structure of the crane" need not be the entire remainder of the structure of the crane, but rather any further components of the crane may be meant.

BRIEF DESCRIPTION OF THE DRAWINGS

Details and advantages of the application are explained with reference to the embodiments that are shown by way of example in the figures.

DETAILED DESCRIPTION

Figure 1:
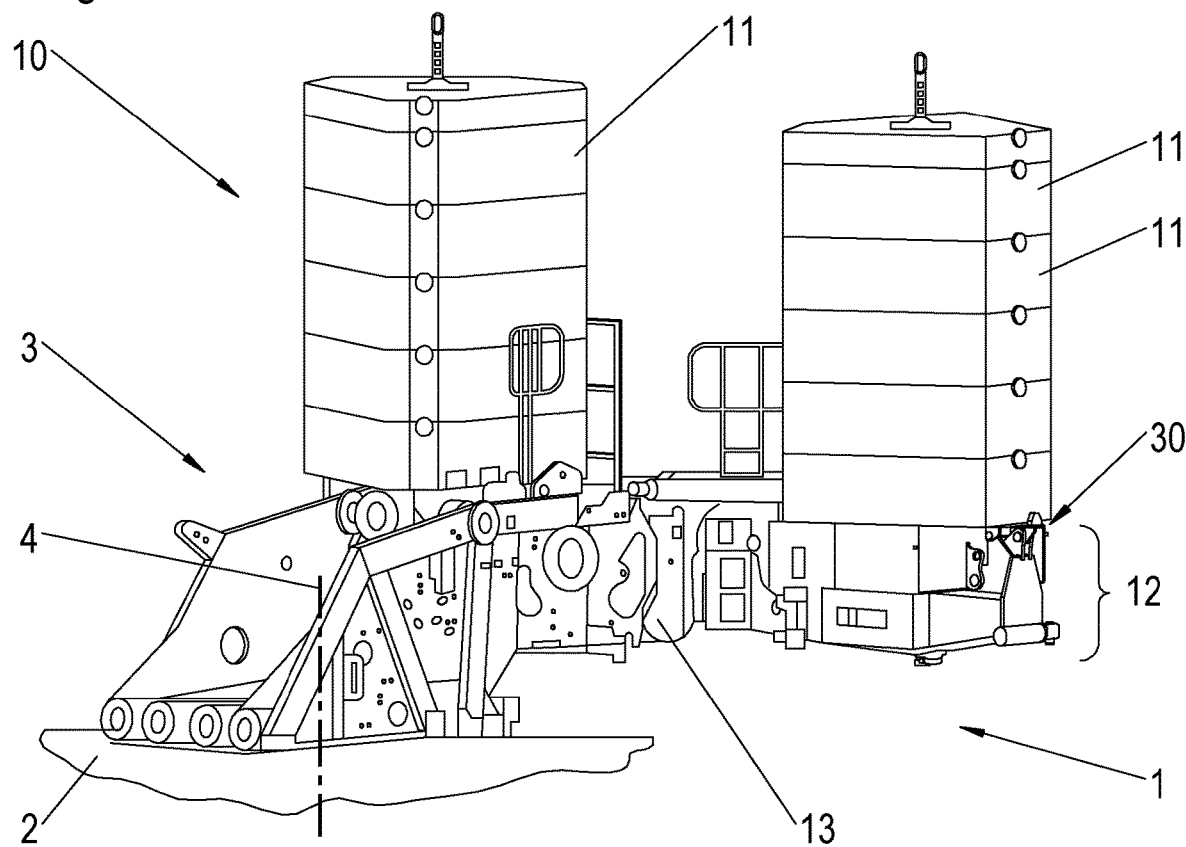
FIG. 1 is an overview of a device according to the application, which is arranged in the region of a superstructure of a crane.

FIG. 1 shows a superstructure 3 of a mobile crane superstructure is mounted on an undercarriage 2 so as to be rotatable about an axis of rotation 4. A ballast assembly 10 is provided on the superstructure 3. Said ballast assembly consists of various ballast plates 11, a carrier means 12 for the ballast plates 11, and a connection unit 13 which connects the ballast assembly 10 to the superstructure 3.

The mobile crane 1 further comprises a control or regulation means which protects the mobile crane 1 from overload. The overload may be tilting of the mobile crane 1, or loading that results in tilting of the mobile crane 1. It is therefore essential for the correct size of the ballast weight to be provided to the control means, or for the correct ballast weight to be stored in the crane control means. Entry errors are thus prevented.

Ballast plates 11 are often placed on the carrier means 12 using three seats 200. In this case, the seats 200 may comprise seating points 20, on which the ballast plates or the ballast assembly 10 rest. The seats 200 may also be understood as part of the carrier means 12, wherein the seats 200 may comprise the seating points 20 as well as further components of the device according to the application. Using three seats 200 means that the system of the resting and the force transmission are statically determined. At least one of the seats 200 or of the seating points 20 may comprise a weighing device 21 or may be configured as such a device.

Common measuring systems described herein are modified and overcomes some technical problems also described herein. The force which the mass of the ballast introduces into the seating point 20 comprising the weighing device 21 is thus no longer measured directly in the gauge block or in the weighing device 21 by means of a thin-film sensor.

The configuration of the measuring unit, in this case the weighing device 21, is described below.

The seating point 20 and/or further parts of the seat 200 may travel a short path under the load of the ballast plates 11. This path may be located in the region of the elastic deformation of the component or components that is/are moved.

The path travelled may be measured by means of stresses in the material for example. The measurement may be performed using a measurement shaft 22 which deflects upon corresponding loading.

The seating point 20 may be spherical in order to result in a defined force introduction.

The measurement shaft 22 may be located below the spherical seating point 20. The measurement shaft 22 is thus located, in a defined manner, in the flow of force, and the measuring accuracy of the device is increased. This configuration reduces the friction about the tilt shaft 24, since said shaft absorbs only a small force.

If necessary, stop points 23 can hold the weighing device 21 in position, and restrict the path or the freedom of movement of the weighing device 21 in at least one direction. Said stop points 23 may be configured in various manners.

FIG. 2A to 2F show some possible embodiments of the application. The ballast plates 11 are positioned and held in the interlocking connection 30. If increased friction occurs at said interlocking connection 30, and thus the seating point 20 comprising the weighing device 21 is unloaded, the measurement is then still not distorted. Both forces continue to flow via the measurement shaft 22 into the further structure of the mobile crane 1.

The measuring accuracy and the measuring range of the device are adjustable. The forces can be distributed appropriately by means of appropriate selection of the spacings between the seating point 20, the tilt shaft 24, and the measurement shaft 22. This is not necessarily possible in the alternative solutions from FIG. 3A to 3C.

The measurement shaft 22 may be arranged in the carrier means 12. The measurement shaft may be arranged in the flow of force between the seating point 20 and the carrier means 12.

A suitable fit is provided between the measurement shaft 22 and the compensator 25. The compensator 25 forms one element, together with the seating point 20 and the connection 30. Said connected element pivots about the tilt shaft 24.

The side surfaces, which guide the compensator 25 on the carrier means 12, are finished such that they absorb the forces and do not have an interfering effect on the measurement shaft 22.

The measurement of the weight can take place continuously. As a result, said measurement can also take place when moving the crane, as well as when mounting/equipping the crane. Suitable shaping, and optionally finishing, of the guide surfaces makes it possible to keep horizontal loads, for example from accelerations, inclined positions or assembly processes, away from the measurement shaft.

Figure 2A:
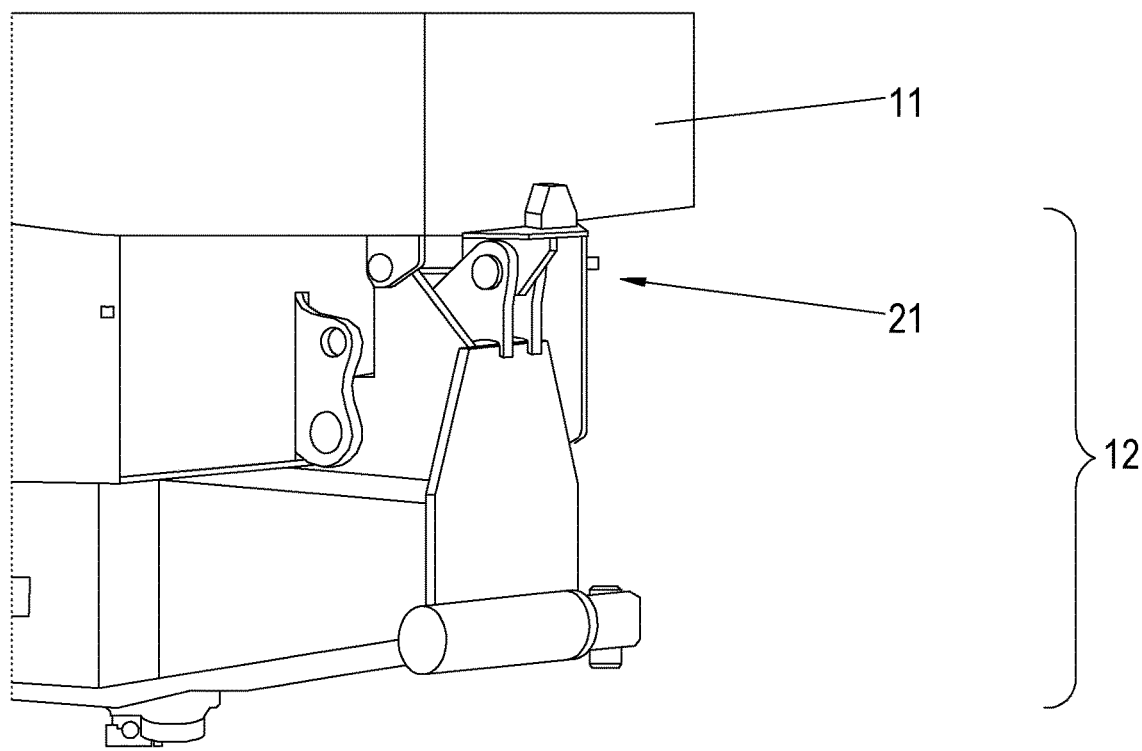
FIG. 2A-2F are detailed views of some components of the device according to the application.
Figure 2B:
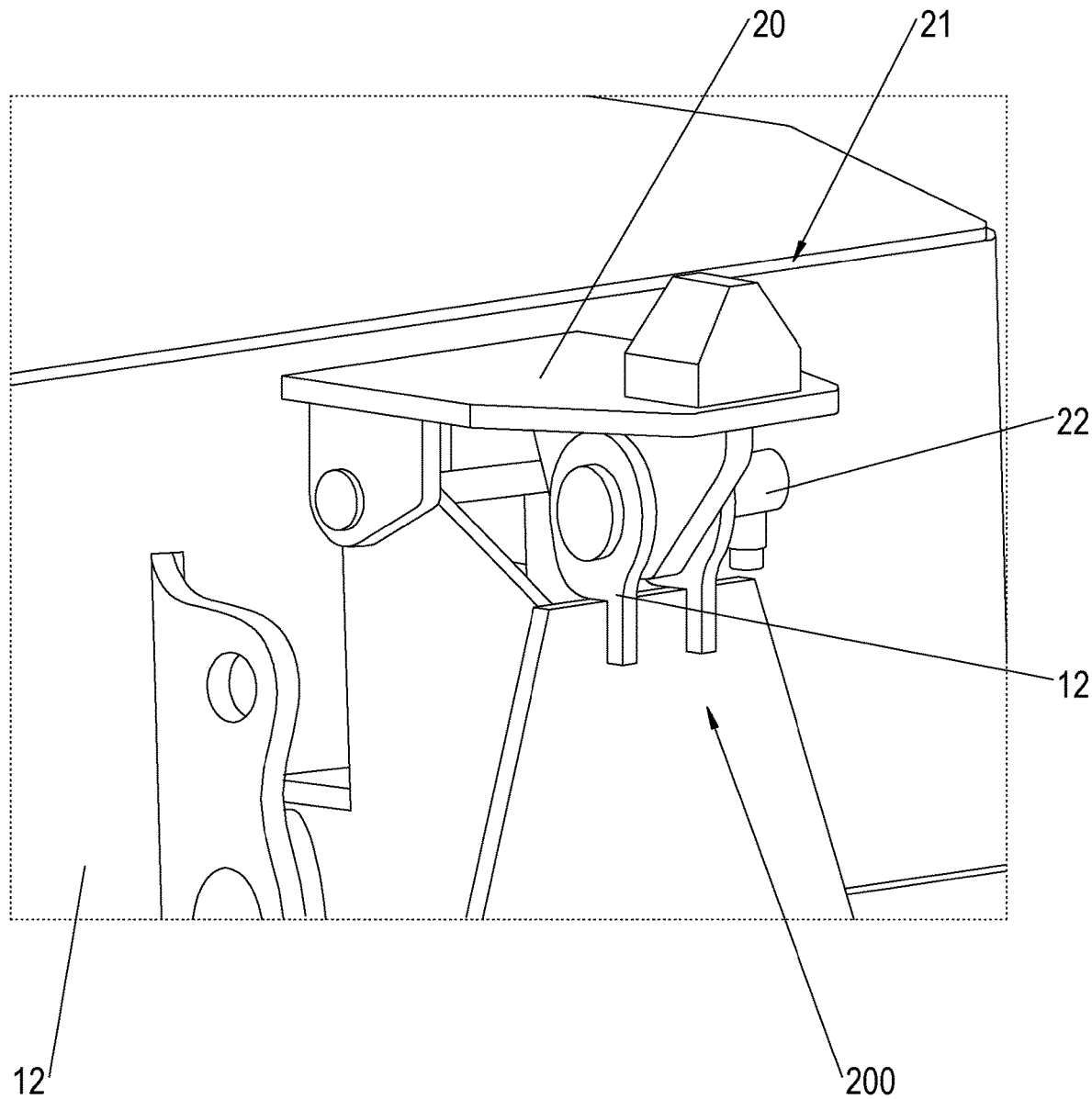
Figure 2C:
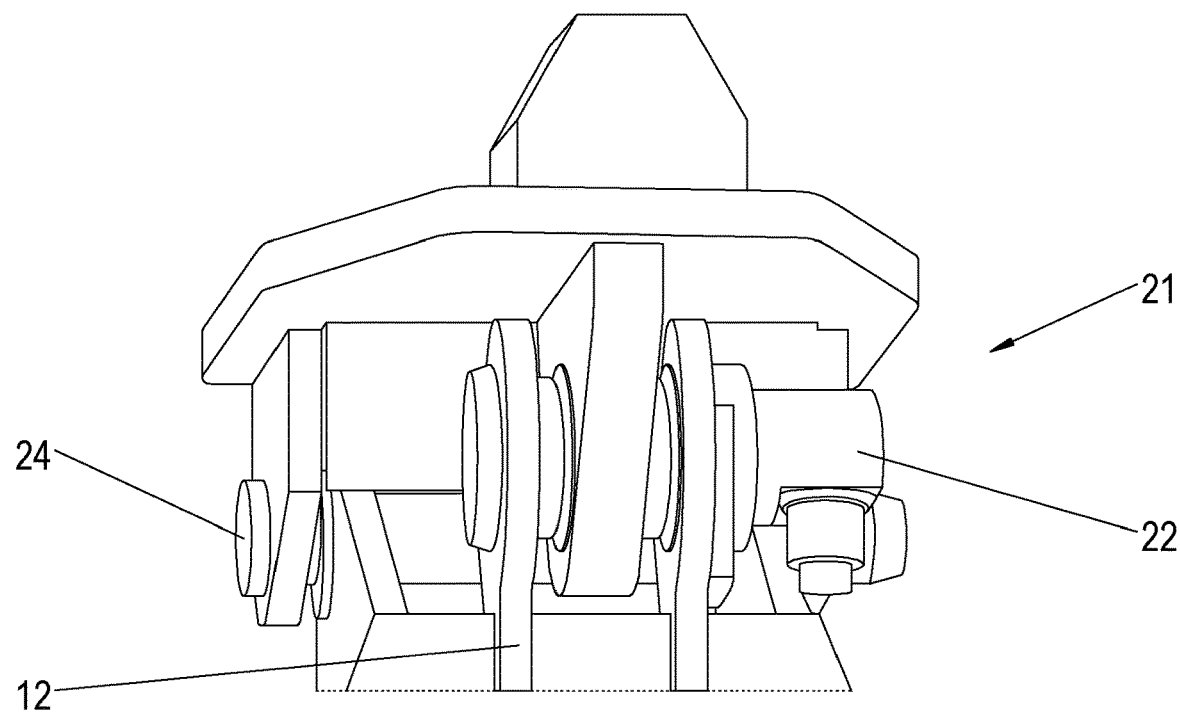
Figure 2D:
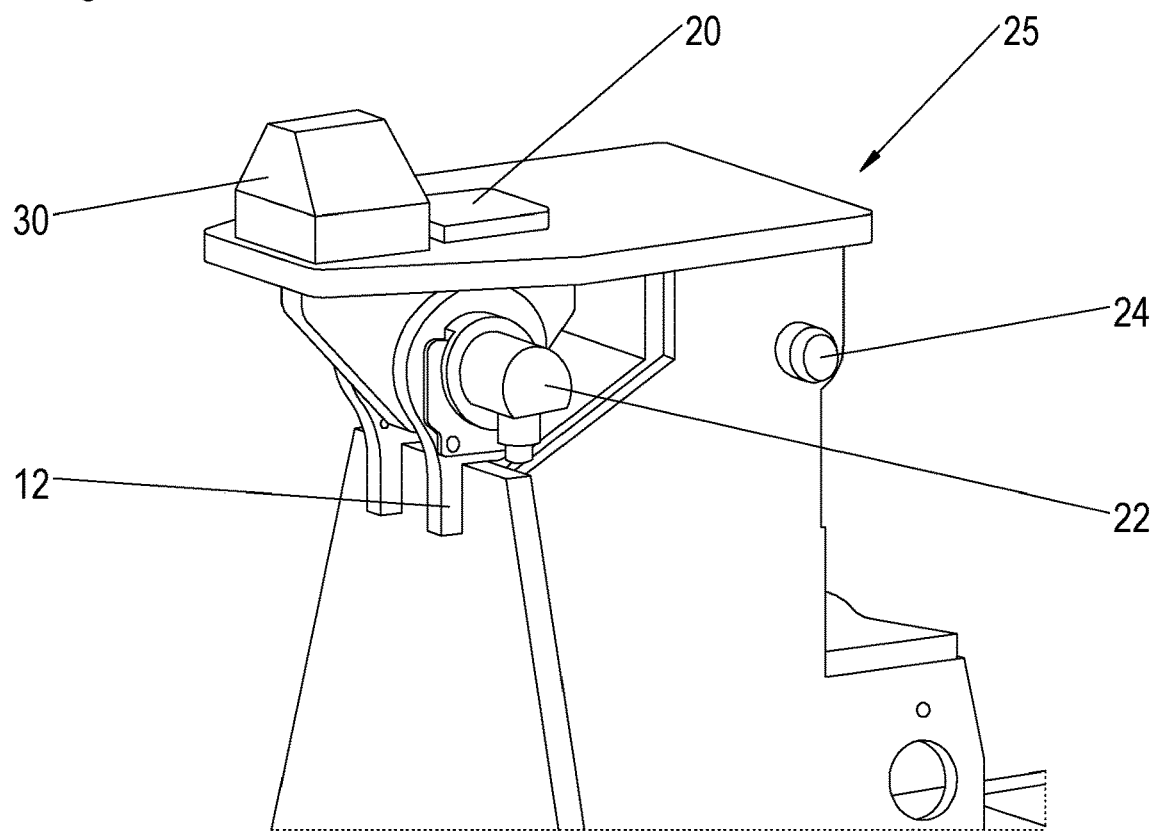
Figure 2E:
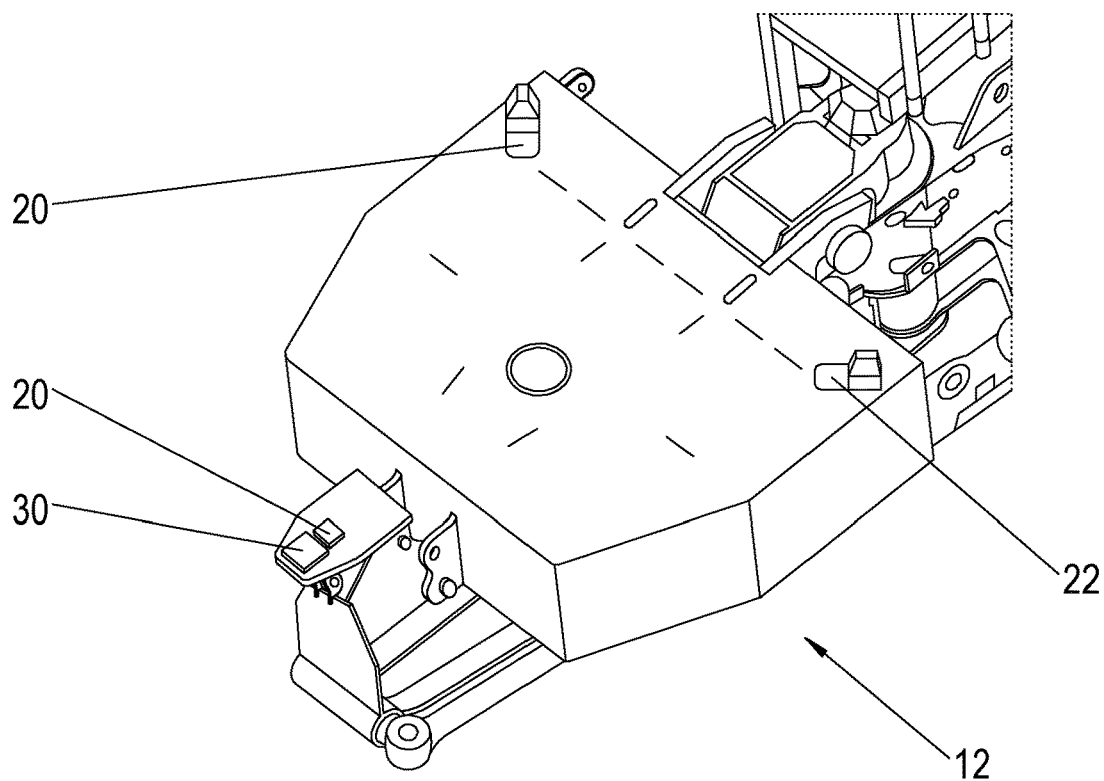
Figure 2F:
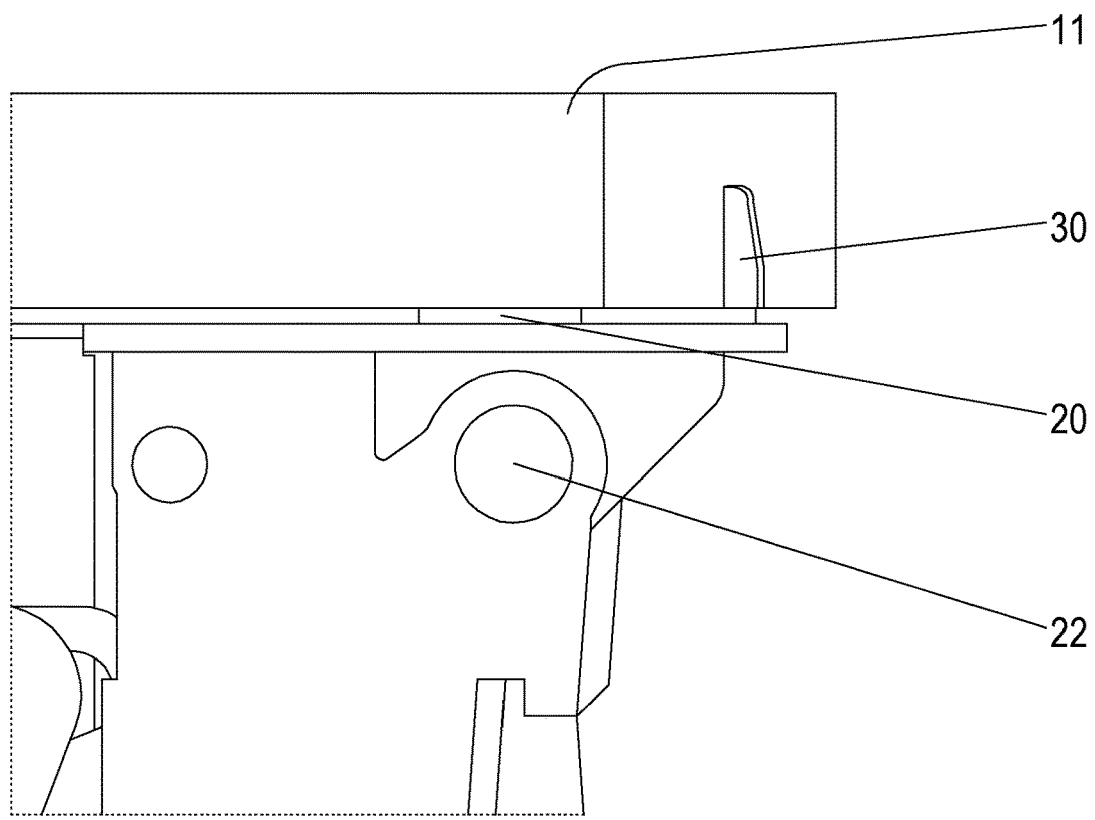
Figure 3A:
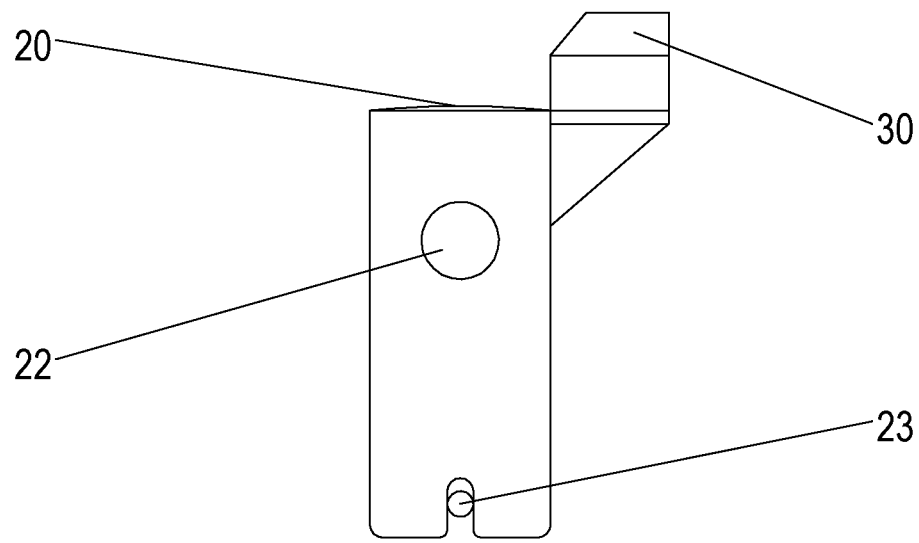
FIG. 3A-3C are schematic views of different stop points of the device according to the application.

The stop point 23 may be configured as a measuring pin or measurement shaft 22 which restricts the pivot movement about a tilt shaft 24, as is shown in FIG. 2D. The stop point 23 may be configured as a pin or as a torque support which is guided in a groove, as is shown in FIG. 3A.

Figure 3B:
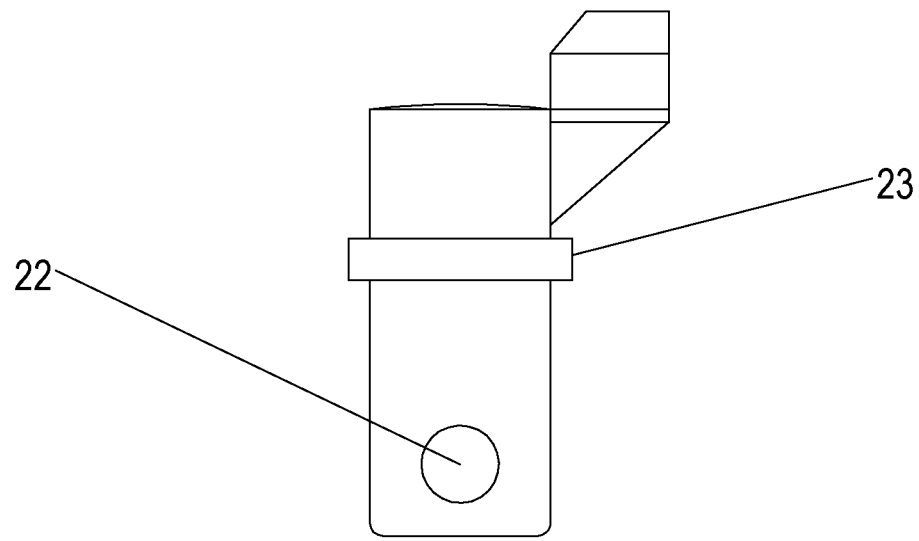
Figure 3C:
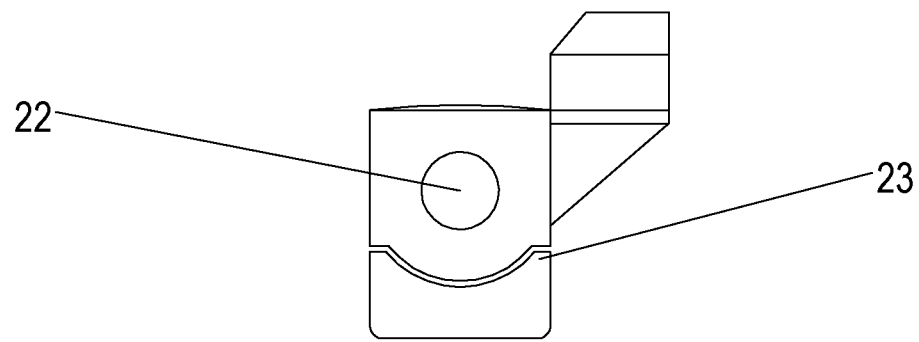

The stop point 23 may be configured as a ring comprising a recess as a torque support, in which the weighing device 21 can move, as is shown in FIG. 3B. The stop point 23 may be configured as a shoulder, on which the weighing device 21 can rest, as is shown in FIG. 3C. In the latter case, it should be noted that the spherical design may be rather disruptive. A planar contact surface may be advantageous in this embodiment.

The object which is achieved by the spherical design of the seating point 20 is that of defined introduction of the weight force of the ballast assembly 10, in order to determine the mass of the applied ballast. It should be noted that the weight force of the applied ballast plates 11 is introduced at three points. The force is measured at one of the three points, which is the weighing device 21. In order to be able to determine the mass of the ballast by means of said measured force, the geometric ratios between the center of gravity and the seats 200 or the seating points 20 will be known. Consequently, the spherical design can also be replaced by another technical solution. For example, at least one of the seating points 20 may comprise a gimbal and/or a spherical bearing.

In the solution described above, the weight force of the ballast is introduced directly via the measuring point. This prevents the friction of the ballast on the shaft 24 from falsifying the measurement result.

LIST OF REFERENCE SIGNS

Mobile crane 1
Substructure 2
Superstructure 3
Axis of rotation 4
Ballast assembly 10
Ballast plates 11
Carrier means 12
Connection unit 13
Seating points 20
Weighing device 21
Measurement shaft 22
Stop points 23
Tilt shaft 24
Compensator 25
interlocking connection 30
Seats 200

The invention claimed is:

1. A device for measuring the weight of a ballast assembly of a crane,
the ballast assembly is coupled to the remainder of the structure of the crane by at least three seats,
the seats comprising seating points on which the ballast assembly rests,
at least one of the seats is configured as a weighing device comprising at least one measurement shaft, wherein the measurement shaft is a component that is different from the seating point, and wherein the weight of the ballast assembly can be determined on the basis of the loading and/or deformation of the measurement shaft.

2. The device according to claim 1, wherein the measurement shaft is arranged directly below the seating point.

3. The device according to claim 1, wherein the at least one seat configured as a weighing device is arranged so as to be pivotable, about a tilt shaft, relative to the remainder of the structure of the crane.

4. The device according to claim 1, wherein at least one stop point is provided for fixing the at least one seat configured as a weighing device relative to the remainder of the structure of the crane.

5. The device according to claim 4, wherein the at least one stop point is the measurement shalt.

6. The device according to claim 5, wherein the at least one stop point is configured as a bolt running in a groove, as a ring comprising a recess, or as a shoulder.

7. The device according to claim 1, wherein the seating point is at least one of: spherical, planar, comprising a gimbal and comprising a spherical bearing.

8. The device according to claim 1, wherein a connection is provided, which is configured for positioning the ballast assembly in an interlocking manner with respect to the remainder of the structure of the crane.

9. The device according to claim 8, wherein the connection and the seating point are configured to introduce the weight force of the ballast assembly into the remainder of the structure of the crane, via the measurement shaft.

10. The crane comprising at least one device for measuring the weight of a ballast assembly of a crane,
the ballast assembly is coupled to the remainder of the structure of the crane by at least three seats,
the seats comprising seating points on which the ballast assembly rests,
at least one of the seats is configured as a weighing device comprising at least one measurement shaft, wherein the measurement shaft is a component that is different from the seating point, and wherein the weight of the ballast assembly can be determined on the basis of the loading and/or deformation of the measurement shaft.

11. A device for measuring the weight of a ballast assembly of a crane,
the ballast assembly coupled to a structure of the crane by at least three seats and each seat comprising a seating point where the ballast assembly rests,
at least one of the seats being a weighing device comprising at least one measurement shaft, and
deformation of the measurement shaft indicating the weight of the ballast assembly.

12. The device according to claim 11, wherein the measurement shaft is arranged directly below a respective seating point.

13. The device according to claim 12, wherein the weighing device is pivotable about a tilt shaft.

14. The device according to claim 13, further comprising at least one stop point fixing the weighing device relative to the structure of the crane.

15. The device according to claim 14, wherein the at least one stop point is the measurement shaft.

16. The device according to claim 15, wherein the at least one stop point is at least one of a bolt running in a groove, a ring comprising a recess, or a shoulder.

17. The device according to claim 11, wherein the seating points are at least one of: spherical, planar, comprising a gimbal and comprising a spherical bearing.

18. The device according to claim 17, further comprising an interlocking connection between the ballast assembly and the structure of the crane.

19. The device according to claim 18, wherein the interlocking connection and the seating points connect the ballast assembly to the structure of the crane via the measurement shaft.

\* \* \* \* \*